(12) United States Patent
Kim (10) Patent No.: US 7,750,995 B2
(45) Date of Patent: Jul. 6, 2010

(54) LIQUID CRYSTAL DISPLAY WITH POLARIZER HAVING PATTERNED LAYERS OF METAL LINES AND RETARDATION FILMS

(75) Inventor: Jae-Hyun Kim, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 483 days.

(21) Appl. No.: 11/440,601

(22) Filed: May 24, 2006

(65) Prior Publication Data

US 2006/0290846 A1 Dec. 28, 2006

(30) Foreign Application Priority Data

Jun. 24, 2005 (KR) ...................... 10-2005-0054848

(51) Int. Cl.
*G02F 1/1335* (2006.01)
(52) U.S. Cl. .................... 349/96; 349/113; 349/117
(58) Field of Classification Search ......... 349/113–115, 349/96, 117–121
See application file for complete search history.

(56) References Cited

U.S. PATENT DOCUMENTS

| | | | |
|---|---|---|---|
| 5,986,730 A * | 11/1999 | Hansen et al. ............ | 349/96 |
| 6,020,944 A * | 2/2000 | Hoshi ...................... | 349/62 |
| 6,124,913 A * | 9/2000 | Mazaki et al. ............ | 349/117 |
| 6,597,418 B2 * | 7/2003 | Moon et al. .............. | 349/98 |
| 2001/0004274 A1 * | 6/2001 | Sakamoto et al. ........ | 349/43 |
| 2004/0141108 A1 * | 7/2004 | Tanaka et al. ............ | 349/96 |
| 2008/0002106 A1 * | 1/2008 | Van De Witte et al. ... | 349/96 |

FOREIGN PATENT DOCUMENTS

| | | |
|---|---|---|
| CN | 1191610 | 8/1998 |
| CN | 1228167 | 9/1999 |
| CN | 1306626 | 8/2001 |
| CN | 1412582 | 4/2003 |
| CN | 1474214 | 2/2004 |
| CN | 1508595 | 6/2004 |
| JP | 2001188126 A * | 7/2001 |

OTHER PUBLICATIONS

English Abstract for CN Pat. Pub. No. 1191610.
English Abstract for CN Pat. Pub. No. 1412582.
English Abstract for CN Pat. Pub. No. 1228167.
English Abstract for CN Pat. Pub. No. 1508595.
English Abstract for CN Pat. Pub. No. 1474214.
English Abstract for CN Pat. Pub. No. 1306626.

* cited by examiner

*Primary Examiner*—David Nelms
*Assistant Examiner*—Jessica M Merlin
(74) *Attorney, Agent, or Firm*—Innovation Counsel LLP (57) ABSTRACT

Disclosed is a liquid crystal display. In the LCD, a reflective polarizer and an optical retarder are provided between an absorbing polarizer and a backlight unit. This structure recycles light that would ordinarily be removed by absorption in conventional LCDs to be used for the display, so that light efficiency and display luminance of the LCD may be improved.

11 Claims, 9 Drawing Sheets

LIQUID CRYSTAL DISPLAY WITH POLARIZER HAVING PATTERNED LAYERS OF METAL LINES AND RETARDATION FILMS

CROSS-REFERENCE TO RELATED APPLICATIONS

This application claims priority to corresponding Korean Patent Application No. 10-2005-0054848 filed in the Korean Intellectual Property Office, Republic of Korea, on Jun. 24, 2005, the entire contents of which are incorporated by reference herein.

BACKGROUND OF THE INVENTION (a) Field of the Invention

The present invention relates to a liquid crystal display (LCD).

(b) Description of the Related Art

Generally, an LCD includes a pair of panels each having electrodes on their inner surfaces, and a dielectric anisotropy liquid crystal (LC) layer interposed between the panels. In an LCD, a variation of the voltage difference between the field generating electrodes, i.e., the variation in the strength of an electric field generated by the electrodes, changes the transmittance of the light passing through the LCD, and thus desired images are obtained by controlling the voltage difference between the electrodes.

Depending on the type of light source used for image display, LCDs are divided into three types: transmissive, reflective, and transflective. In transmissive LCDs, pixels are illuminated from behind using a backlight. In reflective LCDs, the pixels are illuminated from the front using incident light originating from the ambient environment. The transflective LCDs combine transmissive and reflective characteristics. Under medium light conditions such as an indoor environment, or under complete darkness conditions, these LCDs are operated in a transmissive mode, while under very bright conditions, such as an outdoor environment, they are operated in a reflective mode.

The transmissive LCD and the transflective LCD are often used since they provide relatively high display luminance compared to the reflective LCD type.

However, in these two types of LCDs, a polarizer attached to a lower surface of the LCD absorbs about 50% of light emitted from the backlight, and therefore only the remaining 50% is used for the display. As a result, light efficiency and display luminance of the LCD are less than optimal.

SUMMARY OF THE INVENTION

In accordance with the present invention, the display luminance of an LCD is improved by reducing an absorptive loss of light emitted from a backlight unit of the LCD.

According to an aspect of the present invention, there is provided an LCD including a display panel, a reflective polarizer that is provided under the display panel for transmitting light that is linearly polarized in a first direction and reflecting light that is linearly polarized in a second direction perpendicular to the first direction, an optical retarder that is provided under the reflective polarizer; and a backlight unit provided under the optical retarder, said backlight unit comprising a light source for supplying light to the display panel.

The LCD may further include a first absorbing polarizer that is provided between the display panel and the reflective polarizer, and a transmission axis of the first absorbing polarizer may be in the first direction.

The LCD may further include a second absorbing polarizer that is attached to an upper surface of the display panel, and a transmission axis of the second absorbing polarizer may be in the second direction.

The optical retarder has a slow axis and a fast axis, and a phase difference between the two axes may be a quarter-wave for converting circularly polarized light into linearly polarized light and linearly polarized light into circularly polarized light. The fast axis or the slow axis of the optical retarder may be formed at an angle of ±45° relative to the first direction or the second direction.

The reflective polarizer includes a substrate and a plurality of metal lines formed on a surface of the substrate, and an interval between the two adjacent metal lines may be narrower than a wavelength of visible light supplied by the backlight unit.

The metal lines of the reflective polarizer may be parallel to each other in the second direction.

The backlight unit may further include a reflective plate for reflecting light toward the display panel that is provided above the backlight unit.

According to another aspect, there is provided another LCD which includes a display panel, a reflective polarizer that is provided under the display panel to transmit light that is linearly polarized in a first direction and to reflect light that is linearly polarized in a second direction perpendicular to the first direction, and a backlight unit that is provided under the reflective polarizer, said backlight unit comprising a light source for supplying light to the display panel.

In this structure, the reflective polarizer includes a substrate, a plurality of metal lines, and an optical retardation film formed under the metal lines. The metal lines of the reflective polarizer are parallel to each other in the second direction, and an interval between the two adjacent metal lines is narrower than a wavelength of visible light supplied by the backlight unit.

The LCD may further include a first absorbing polarizer that is provided between the display panel and the reflective polarizer, and a transmission axis of the first absorbing polarizer may be in the first direction.

The LCD may further include a second absorbing polarizer that is attached to an upper surface of the display panel, and a transmission axis of the second absorbing polarizer may be in the second direction.

The optical retardation film has a slow axis and a fast axis, and a phase difference between the two axes may be a quarter-wave to convert circularly polarized light into linearly polarized light or linearly polarized light into circularly polarized light. The fast axis or the slow axis of the optical retardation film may be formed at ±45° to the first direction or the second direction.

The substrate of the reflective polarizer may be placed on the plurality of metal lines or under the optical retardation film.

The optical retardation film may be obtained by curing liquid crystal.

The backlight unit may further include a reflective plate for reflecting light toward the display panel that is provided above the backlight unit.

BRIEF DESCRIPTION OF THE DRAWINGS

The present invention will become more apparent by description of the preferred embodiments thereof with reference to the accompanying drawings.

DETAILED DESCRIPTION OF THE PREFERRED EMBODIMENTS

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

An LCD according to a preferred embodiment of the present invention will be described in detail below with reference to FIG. 1 through FIG. 5.

Figure 1:
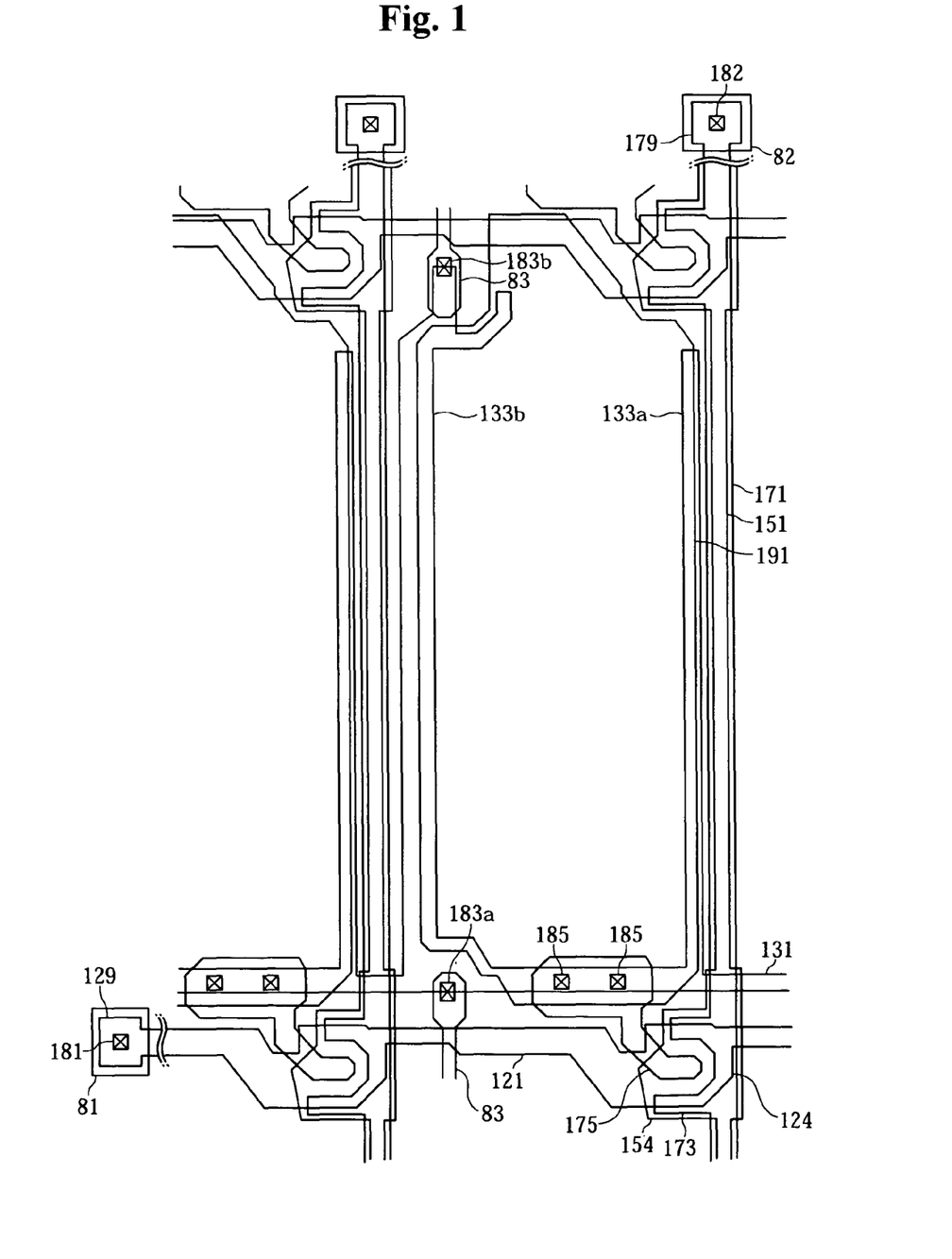
FIG. 1 is a layout view of a TFT array panel of an LCD according to an embodiment of the present invention.
Figure 2:
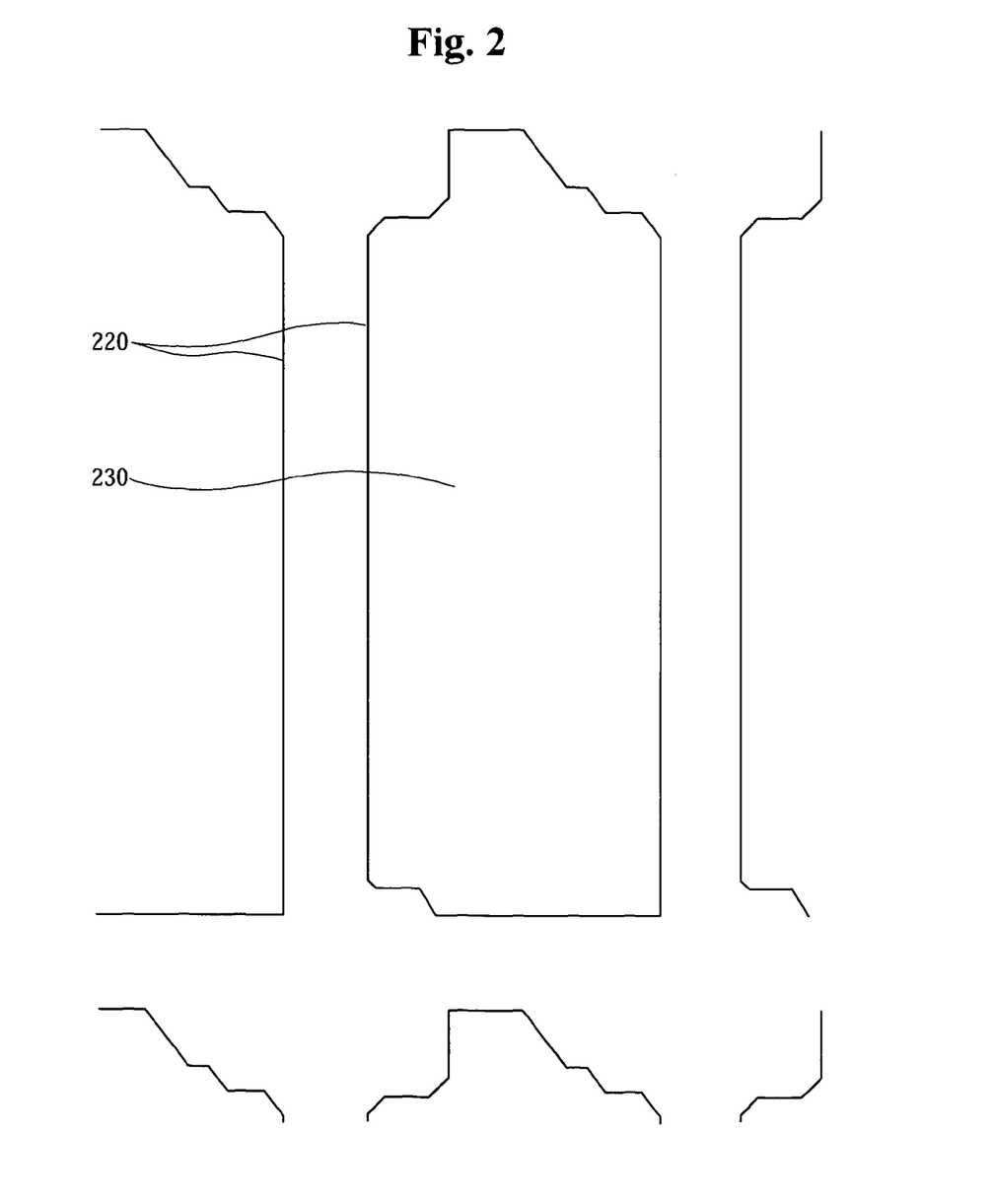
FIG. 2 is a layout view of a common electrode panel of an LCD according to an embodiment of the present invention.
Figure 3:
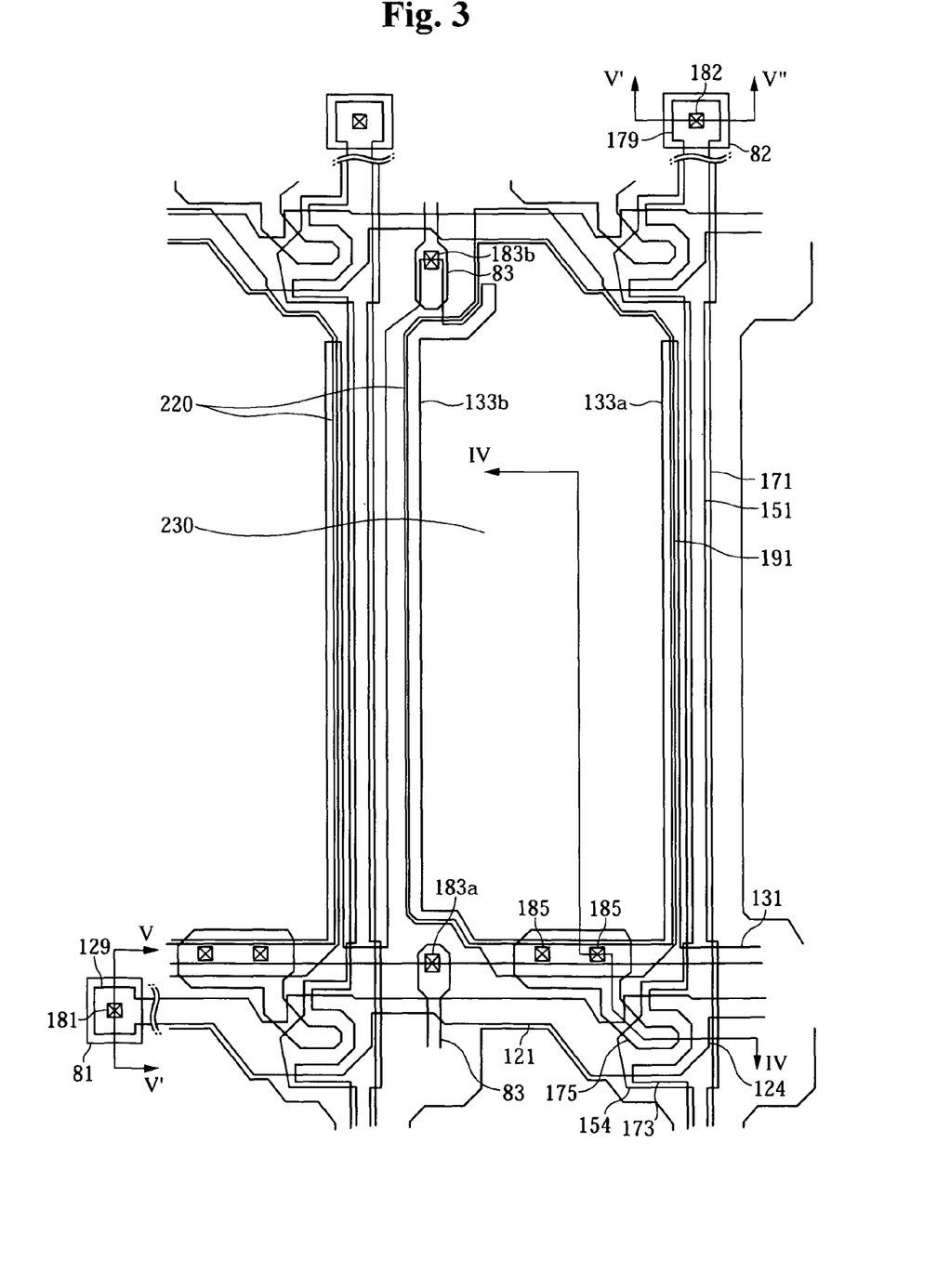
FIG. 3 is a layout view of an LCD incorporating the TFT array panel of FIG. 1 and the common electrode panel of FIG. 2.
Figure 4:
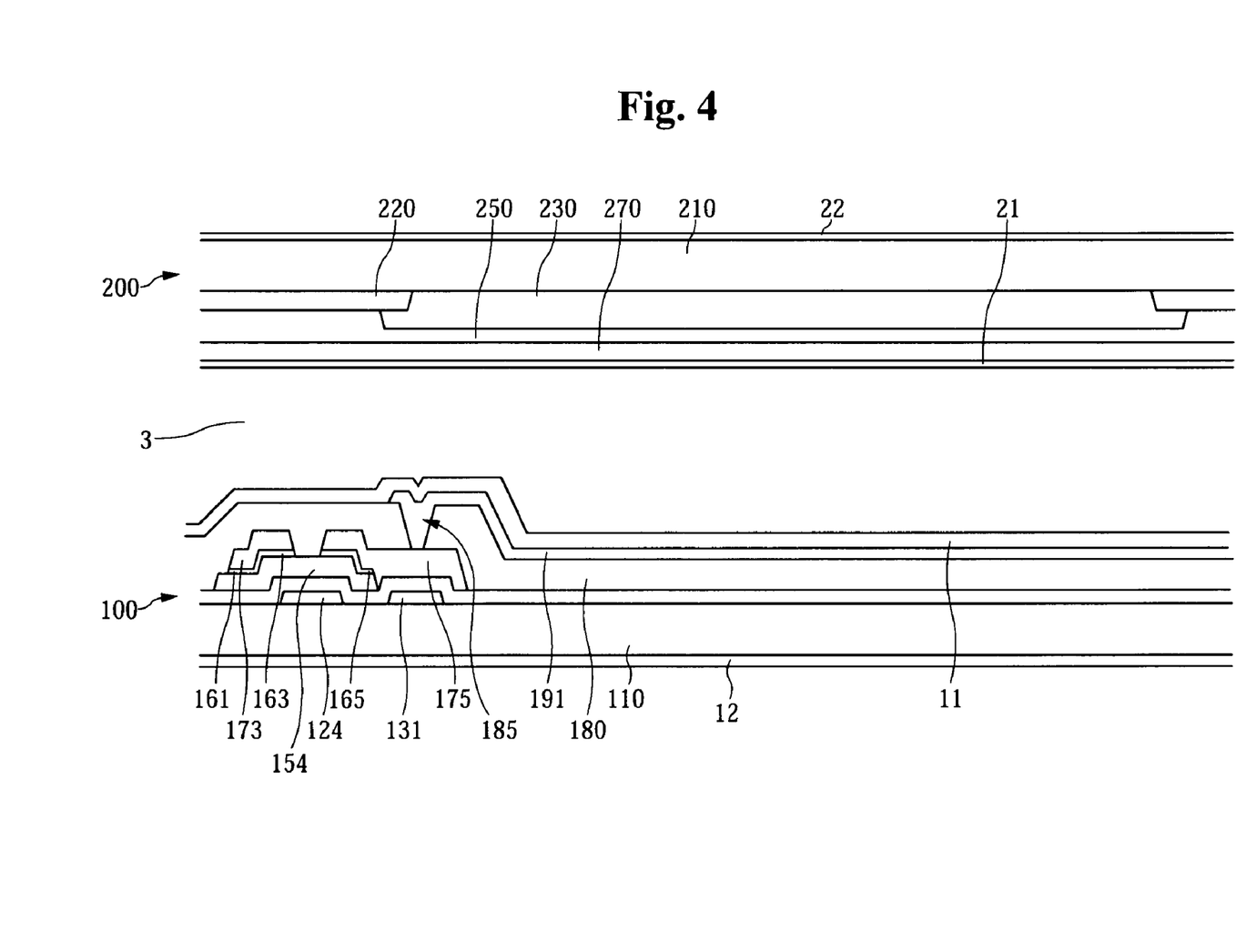
FIG. 4 is a cross-sectional view cut along IV-IV' of FIG. 3.
Figure 5:
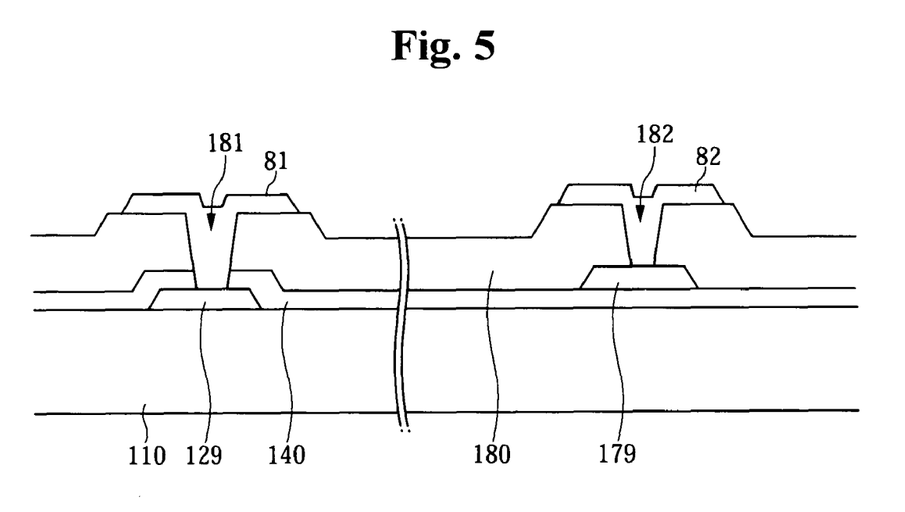
FIG. 5 shows cross-sections cut along V-V' and V'-V'" of FIG. 3, respectively.

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD incorporating the TFT array panel of FIG. 1 and the common electrode panel of FIG. 2, FIG. 4 is a cross-sectional view cut along IV-IV' of FIG. 3, and FIG. 5 shows cross sections cut along V-V' and V'-V'" of FIG. 3, respectively.

Referring to FIG. 1 through FIG. 5, an LCD according to an embodiment of the present invention comprises a TFT array panel 100 and a common electrode panel 200 facing each other, and an LC layer 3 interposed therebetween.

First, the basic structure of the TFT array panel 100 is described below with reference to FIG. 1, FIG. 3, and FIG. 5.

A plurality of gate lines 121 and a plurality of storage electrode lines 131 are formed on an insulating substrate 110 comprising transparent glass or plastic.

The gate lines 121 for transmitting gate signals extend substantially in a horizontal direction (as shown in FIG. 1). Each gate line 121 includes a plurality of gate electrodes 124 protruding downward and an end portion 129 having a relatively large surface area for connection with a different layer or an external device. Gate drivers (not shown) for generating the gate signals may be mounted on a flexible printed circuit film (not shown) attached to the substrate 110, or directly on the substrate 110. Alternatively, the gate drivers may be integrated into the substrate 110. In this case, the gate lines 121 are directly connected to the gate drivers.

The storage electrode lines 131 receive a predetermined voltage. Each storage electrode line 131 comprises a stem line that is substantially parallel to the gate lines 121 and a plurality of pairs of storage electrodes 133a and 133b that extend from the stem line substantially in a vertical direction. Each storage electrode line 131 is provided between two adjacent gate lines 121. In this embodiment, the stem line of the storage electrode line 131 is positioned closer to the lower-positioned gate line of the two adjacent gate lines 121 between which the storage electrode line 131 is provided. Each storage electrode 133a has a fixed end that is connected to one of the stem lines and a free end. Each storage electrode 133b has a fixed end with a relatively large width, which is connected to one of the stem lines, and two free ends including a straight free end and a crooked free end. In other embodiments, the form and arrangement of the storage electrode lines 131 may be varied.

The gate lines 121 and the storage electrode lines 131 preferably comprise an aluminum—(Al) containing metal such as Al and an Al alloy, a silver—(Ag) containing metal such as Ag and a Ag alloy, a copper—(Cu) containing metal such as Cu and a Cu alloy, a molybdenum—(Mo) containing metal such as Mo and a Mo alloy, chrome (Cr), titanium (Ti), or tantalum (Ta). The gate lines 121 and the storage electrode lines 131 may be configured as a multi-layered structure, including at least two conductive layers (not shown) having different physical properties. In such a structure, one of the two conductive layers comprises a low resistivity metal, such as an Al-containing metal, an Ag-containing metal, a Cu-containing metal, or the like, in order to reduce signal delay or voltage drop in the gate lines 121 and the storage electrode lines 131. The other conductive layer comprises a material, such as indium tin oxide (ITO) and indium zinc oxide (IZO), which has desirable physical, chemical, and electrical contact properties with other materials. For example, a Mo-containing metal, Cr, Ta, Ti, etc., may be used for the formation of the conductive layer layer. Suitable examples of multi-layered structures include a lower Cr layer and an upper Al (or Al alloy) layer, and a lower Al (or Al alloy) layer and an upper Mo (or Mo alloy) layer. In addition to the above-listed materials, various other metals, conductors, and combinations thereof can be used for the formation of the gate lines 121 and the storage electrode lines 131.

All lateral sides of the gate lines 121 and the storage electrode lines 131 preferably form an angle in the range from about 30° to about 80° relative to the surface of the substrate 110.

A gate insulating layer 140 comprising silicon nitride ($SiN_x$) or silicon oxide ($SiO_2$) is formed on the gate lines 121 and the storage electrode lines 131.

A plurality of linear semiconductors 151 comprising hydrogenated amorphous silicon (abbreviated as "a-Si") or polysilicon are formed on the gate insulating layer 140. Each linear semiconductor 151 extends substantially in a vertical direction, including a plurality of projections 154 that extend along the respective gate electrodes 124. The linear semiconductors 151 are enlarged in the vicinities of the gate lines 121 and the storage electrode lines 131 in order to provide a large surface area for overlap with the gate lines 121 and the storage electrode lines 131.

A plurality of linear ohmic contacts 161 and island-shaped ohmic contacts 165 are formed on the linear semiconductors 151. The ohmic contacts 161 and 165 may comprise N+ hydrogenated amorphous silicon that is highly doped with N-type impurities such as phosphorus (P) or silicide. The linear ohmic contacts 161 include a plurality of projections 163. A set of a projection 163 and an island-shaped ohmic contact 165 are placed on the projection 154 of the semiconductor 151.

All lateral sides of the linear semiconductors 151 and the ohmic contacts 161 and 165 preferably form an angle in the range from about 30° to about 80° relative to the surface of the substrate 110.

A plurality of data lines 171 and a plurality of drain electrodes 175 are formed on the ohmic contacts 161 and 165 and the gate insulating layer 140.

The data lines 171 for transmitting data signals extend substantially in a vertical direction to intersect with the gate lines 121 and the stem lines of the storage electrode lines 131. In this embodiment, each pair of the storage electrodes 133a and 133b is provided between two adjacent data lines 171. Each data line 171 includes a plurality of source electrodes 173 extending toward the respective gate electrodes 124, and an end portion 179 having a relatively large surface area for connection to a different layer or an external device. Data drivers (not shown) for generating the data signals may be mounted on a flexible printed circuit film (not shown) attached to the substrate 110, or directly on the substrate 110. Alternatively, the data drivers may be integrated into the substrate 110. In this case, the data lines 171 are directly connected to the gate drivers.

The drain electrodes 175 separated from the data lines 171 are opposite to the source electrodes 173, and are centered on the gate electrodes 124. Each drain electrode 175 includes an expansion having a relatively large width and a bar-shaped end portion that is partially surrounded with the curved source electrode 173.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 preferably comprise a refractory metal such as Mo, Cr, Ta, or Ti, or alloys thereof, and may be configured as multi-layered structures including a refractory metal layer (not shown) and a low resistivity conductive layer (not shown). One example of a multi-layered structure includes a lower layer comprising one among Cr, Mo, and a Mo alloy, and an upper layer comprising Al or an Al alloy. Another example is a lower layer comprising Mo or a Mo alloy, an intermediate layer comprising Al or an Al alloy, and an upper layer comprising Mo or a Mo alloy. In addition to the above-listed materials, various other metals, conductors, and combinations thereof can be used for the formation of the data lines 171 and the drain electrodes 175.

All lateral sides of the data lines 171 and the drain electrodes 175 preferably form an angle in the range from about 30° to about 80° relative to the surface of the substrate 110.

The ohmic contacts 161 and 165 are provided only between the underlying semiconductors 151 and the overlying data lines 171 and between the overlying drain electrodes 175 and the underlying semiconductors 151, in order to reduce contact resistance therebetween. Most of the linear semiconductors 151 are formed more narrowly than the data lines 171, but partial portions thereof are enlarged in the vicinities of regions intersecting with the gate lines 121 or the storage electrode lines 131, as previously mentioned, in order to prevent the data lines 171 from being shorted. The linear semiconductors 151 are partially exposed in regions not covered by the data lines 171 and the drain electrodes 175, as well as between the source electrodes 173 and the drain electrodes 175.

A passivation layer 180 is formed on the data lines 171, the drain electrodes 175, and the exposed portions of the semiconductors 151. An upper surface of the passivation layer 180 may be substantially flat. The passivation layer 180 may be configured as a single layer comprising an inorganic insulator, such as $SiN_x$ or $SiO_2$, or an organic insulator. In this case, a desirable organic insulator for the passivation layer 180 has a low dielectric constant of below 4.0 and/or photosensitivity. The passivation layer 180 may also be configured as a double-layered structure including a lower inorganic insulator layer and an upper organic insulator layer. This structure has a prominent insulating property, preventing damage to the exposed portions of the semiconductors 151.

The passivation layer 180 is provided with a plurality of contact holes 182 and 185, through which the end portions 179 of the data lines 171 and the expansions of the drain electrodes 175 are exposed, respectively. A plurality of contact holes 181 are formed in the passivation layer 180 and the gate insulating layer 140, and the end portions 129 of the gate lines 121 are exposed therethrough.

A plurality of pixel electrodes 191, a plurality of overpasses 83, and a plurality of contact assistants 81 and 82 are formed on the passivation layer 180. The pixel electrodes 191, overpasses 83, and contact assistants 81 and 82 may comprise a transparent conductor, such as ITO or IZO, or a reflective metal, such as Al, Ag, Cr, or their alloys.

The pixel electrodes 191 are physically and electrically connected to the drain electrodes 175 through the contact holes 185 in order to receive data voltages from the drain electrodes 175. The pixel electrodes 191 supplied with the data voltages generate electric fields in cooperation with a common electrode 270 of the color filter panel 200, thereby determining the orientations of LC molecules in the LC layer 3 interposed between the two electrodes 191 and 270. The polarization of light passing through the LC layer 3 is controlled by varying the orientations of the LC molecules. Each set of the pixel electrode 191, the corresponding common electrode 270, and the LC layer 3 therebetween forms an LC capacitor capable of storing the applied voltage after the TFT is turned off.

To enhance the capacitance of the LC capacitors, storage capacitors are further provided. The pixel electrodes 191 and the expansions of the drain electrodes 175 that are connected to the pixel electrodes 191 through the contact holes 182 and 185 are overlapped with the storage electrodes 133a and 133b as well as the stem lines of storage electrodes 131. Overlapping the pixel electrodes 191 and the drain electrodes 175 electrically connected thereto with the storage electrode lines 131 creates the storage capacitors.

The contact assistants 81 and 82 are connected to the end portions 129 of the gate lines 121 and the end portions 179 of the data lines 171 through the contact holes 181 and 182, respectively. The contact assistants 81 and 82 supplement adhesion between the exposed end portions 129 and 179 and exterior devices, and protect them.

The overpasses 83 span the gate lines 121 and include a first portion extending upward and a second portion extending downward. The first portion of the overpass 83 is connected to the exposed stem line of the storage electrode line 131 through contact hole 183a, and second portion of the overpass 83 is connected to the exposed straight free end of the storage electrode 133b through contact hole 183b. The overpasses 83 and the storage electrode lines 131 having the storage electrodes 133a and 133b may be used for repairing any defect arising from the gate lines 121 and/or the data lines 171.

The basic structure of the color filter panel 200 is described below with reference to FIG. 2 and FIG. 4.

A light-blocking member 220 called "a black matrix" is provided on an insulating substrate 210 comprising transparent glass or plastic. The light-blocking member 220 comprises portions corresponding to the gate lines 121, the date lines 171, and the TFTs, to prevent light from leaking out through barriers between the pixel electrodes 191.

A plurality of color filters 230 are formed on the substrate 210 having the light-blocking member 220. Most of them are placed within aperture regions delimited by the light-blocking member 220. The color filters 230 may extend along the pixel electrodes 191 in a vertical direction. Each color filter 230 may exhibit either red, green, and blue colors.

An overcoat layer 250 is formed on the light-blocking member 220 and the color filters 230 to prevent the color filters 230 from being exposed and to offer a substantially flat surface. The overcoat layer 250 may comprise an organic insulator. In other embodiments, the overcoat layer 250 may be omitted.

A common electrode 270 comprising a transparent conductor such as ITO or IZO, is formed on the overcoat layer 250.

Alignment layers 11 and 21 are individually coated on the inner surfaces of the panels 100 and 200, respectively. The alignment layers 11 and 21 may comprise vertical alignment layers.

Polarizers 12 and 22 are provided on the outer surfaces of the panels 100 and 200, respectively. Their transmission axes are oriented to form a right angle relative to each other. In this embodiment, one of the transmission axes is preferably parallel to the gate lines 121.

The LC molecules in the LC layer 3 have negative dielectric anisotropy. In the absence of an electric field, they are aligned substantially perpendicular to the surfaces of the two panels 100 and 200. In this case, incident light cannot pass through the polarizers 12 and 22 because the directions of polarization of the polarizers 12 and 22 are perpendicular.

When the common electrode 270 is supplied with a common voltage and the pixel electrode 191 is supplied with a data voltage, an electric field, which is perpendicular to the surfaces of the two panels 100 and 200, is generated in the LC layer 3. In response to the electric field, the LC molecules in the LC layer 3 begin to change their orientation to be perpendicular to the direction of the electric field.

Figure 6:
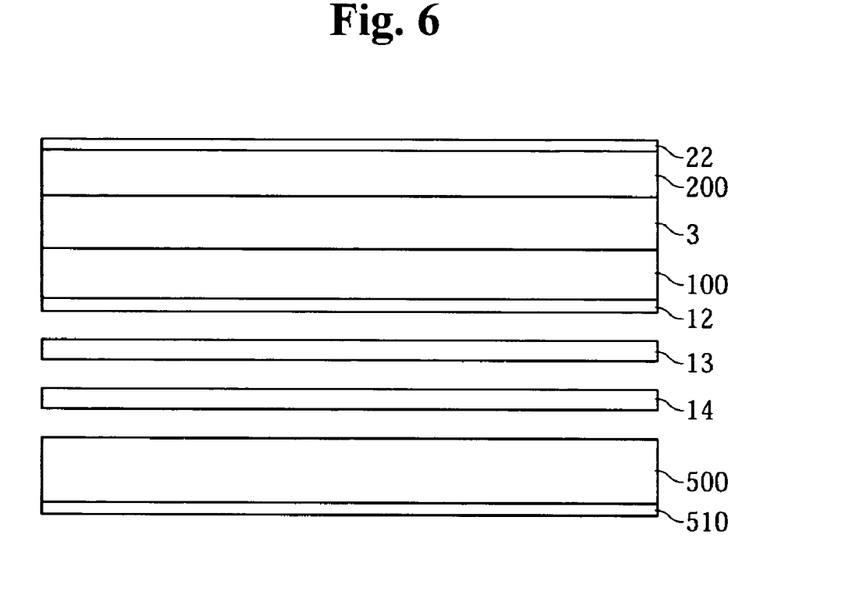
FIG. 6 shows a schematic cross-sectional view of an LCD according to an embodiment of the present invention.

FIG. 6 shows a schematic cross-sectional view of an LCD according to an embodiment of the present invention.

In this embodiment, the polarizer 12 comprises an absorbing polarizer 12, and the LCD further comprises a reflective polarizer 13, an optical retarder 14, and a backlight unit 500, in addition to the TFT array panel 100, the common electrode panel 200, and the LC layer 3 shown in FIG. 1 through FIG. 5.

Referring to FIG. 6, the absorbing polarizer 12 is attached to a lower surface of the TFT array panel 100, and the reflective polarizer 13 and the optical retarder 14 in this order are disposed under the absorbing polarizer 12. The backlight unit 500 is disposed under the optical retarder 14, and a reflective plate 510 is provided on a lower surface of the backlight unit 500.

Figure 7:
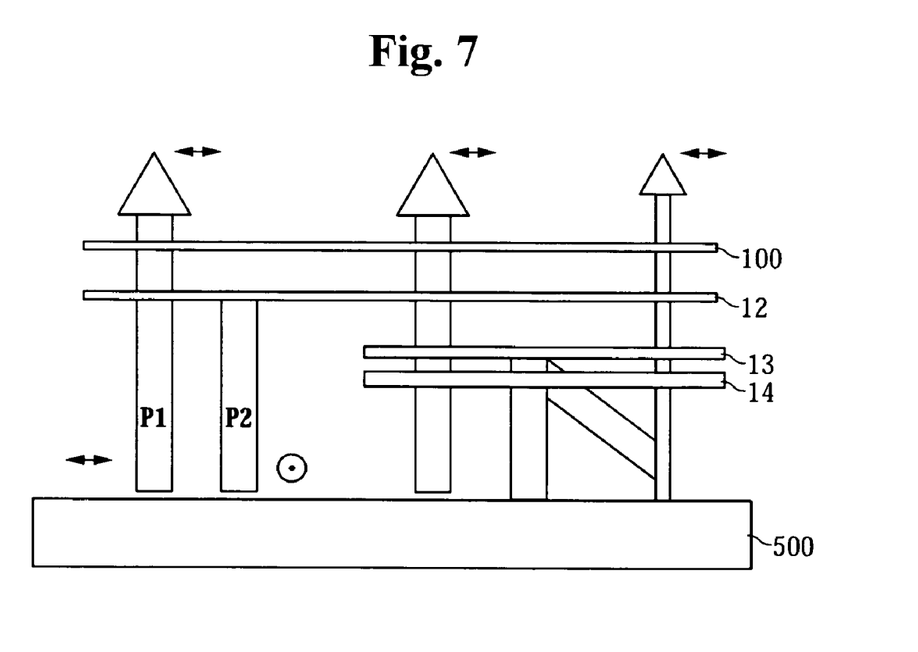
FIG. 7 is a view for comparing light efficiency and light paths between portions with and without a reflective polarizer and an optical retarder in an LCD according to the present invention.
Figure 11:
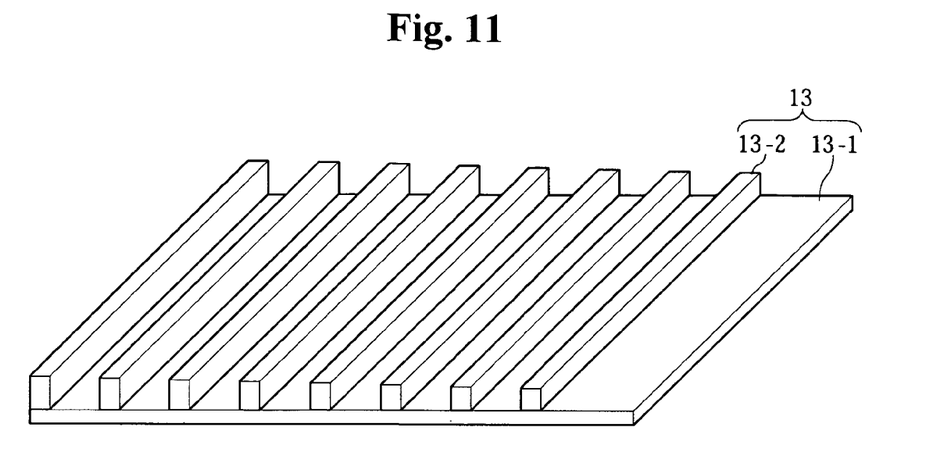
FIG. 11 is a perspective view of a reflective polarizer according to an embodiment of the present invention.

As shown in FIG. 7, the reflective polarizer 13 transmits incident light that is linearly polarized in the X direction (↔) and reflects incident light that is linearly polarized in the Y direction (⊙), which is perpendicular to the X direction (↔). The structure of the reflective polarizer 13 is shown in FIG. 11 and will be described in greater detail below. In addition, the absorbing polarizer 12 transmits incident light that is linearly polarized in the X direction (↔) and absorbs incident light that is linearly polarized in the Y direction (⊙). Accordingly, light passing through the reflective polarizer 13 can also pass through the absorbing polarizer 12.

The optical retarder 14, which is disposed under the reflective polarizer 13, has a slow axis and a fast axis. Accordingly, light passing through the fast axis obtains a faster phase than that of light passing through the slow axis. In this embodiment, a phase difference between the two axes is a quarter-wave to convert circularly polarized light into linearly polarized light or linearly polarized light into circularly polarized light. In this embodiment, it is preferable that the two axes are perpendicular to each other and are formed at ±45° relative to transmission axes of the polarizers 12, 22, and 13, respectively.

FIG. 7 is a view for comparing light efficiency and light paths between portions with and without a reflective polarizer and an optical retarder in an LCD according to the present invention.

The left half of FIG. 7 shows a portion of the LCD with only the absorbing polarizer 12 without the reflective polarizer 13 and the optical retarder 14. In this case, only light in the X direction (↔) can be used for the display. Whereas, in the case that the polarizers 12 and 13 and the optical retarder 14 are all provided between the panel 100 and backlight unit 500 as shown in the right half of FIG. 7, light in the Y direction (⊙) can also be used for the display together with the light in the X direction (↔) by using a light recycling process.

Figure 8:
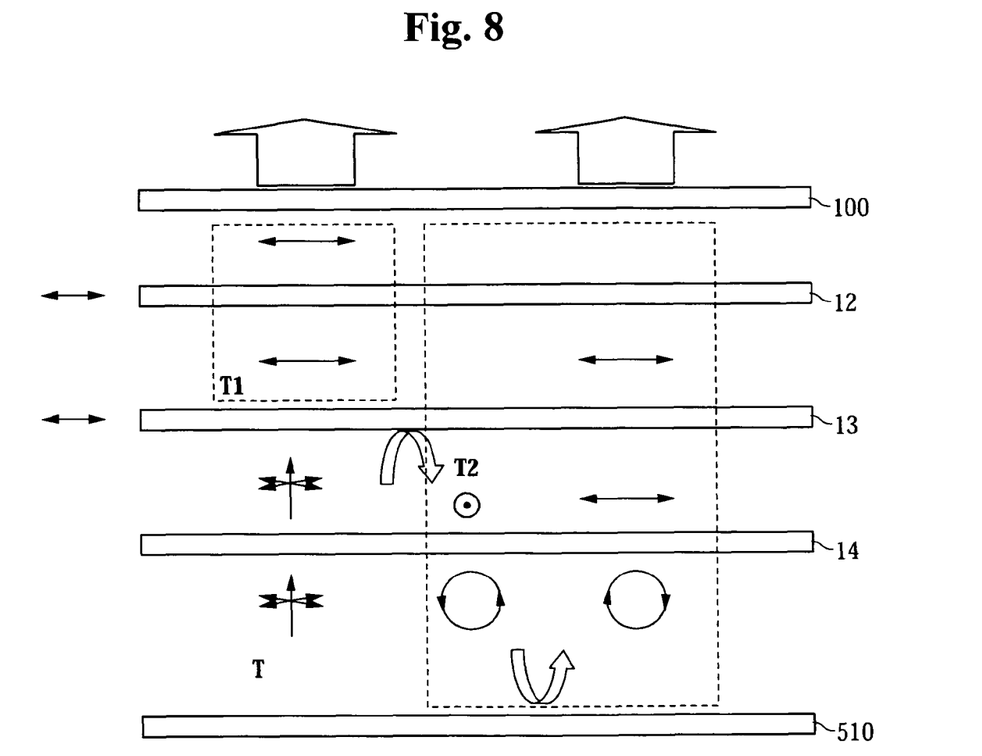
FIG. 8 shows the polarization states of light in the LCD of FIG. 6.

FIG. 8 shows the polarization states of light in the LCD of FIG. 6. This figure shows only primary components that have influence on the polarization of light so that the light emitted from the backlight unit 500 is incident onto the TFT array panel 100.

Referring to FIG. 8, light (T) emitted from the backlight unit 500 is incident onto the optical retarder 14. This light (T) is unpolarized and includes all components. The optical retarder 14 transmits all incident light (T) without polarization. The light is then incident onto the reflective polarizer 13. The reflective polarizer 13 only transmits the X direction (↔) component of the incident light (T), and reflects the Y direction (⊙) component of the light (T). Hereinafter, successive paths of the light (T1) passing through the reflective polarizer 13 and the light (T2) reflected by the reflective polarizer 13 are separately described.

The transmitted light (T1) is incident onto the absorbing polarizer 12. This transmitted light (T1) through the polarizer 12 since a transmission axis of the polarizer 12 is in the X direction (↔). The light (T1) is then incident onto the TFT array panel 100.

On the other hand, the light reflected (T2) by the reflective polarizer 13 is incident onto the optical retarder 14 again. The light (T2) then passes through the optical retarder 14. At this time, the light (T2) is converted to left-handed circularly polarized light by the optical retarder 14. The left-handed circularly polarized light is incident onto the reflective plate 510 of the backlight unit 500, and then reflected by the reflective plate 510. With the reflection, the left-circularly polarized light is converted to right-circularly polarized light. Then, the right-circularly polarized light passes through the optical retarder 14. As the right-circularly polarized light passes through the optical retarder 14, the right-circularly polarized light is converted to linearly polarized light in the X direction (↔).

Since the reflected light (T2) is converted to linearly polarized light in the X direction in this manner, the reflected light (T2) can pass through the reflective polarizer 13 and the absorbing polarizer 12 to be incident upon the TFT array panel 100. In this way, the light that would ordinarily be removed by absorption in conventional LCDs is recycled for the display, thereby improving light efficiency and display luminance of the LCD.

Figure 9:
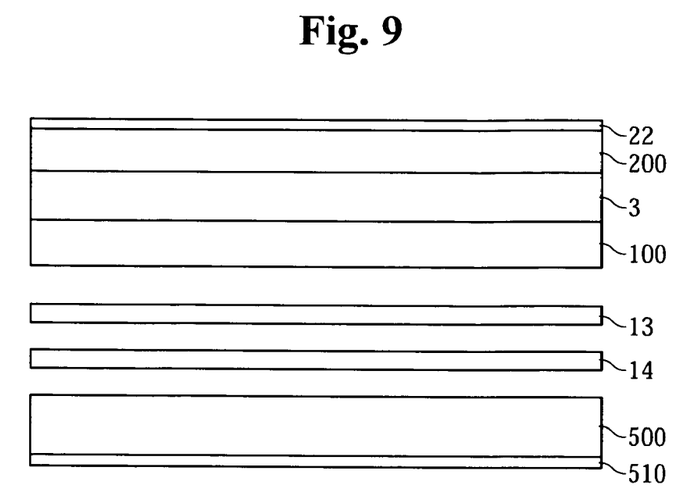
FIG. 9 shows a schematic cross-sectional view of an LCD according to another embodiment of the present invention.

FIG. 9 shows a schematic cross-sectional view of an LCD according to another embodiment of the present invention.

In this embodiment, the absorbing polarizer 12 of FIG. 6 is omitted. This is possible because the transmission axes of the reflective polarizer 13 and the absorbing polarizer 12 are in the same direction (↔). Therefore, the two polarizers 12 and 13 serve similar functions.

An LCD without the absorbing polarizer 12 may have some advantages and disadvantages, as described below.

Generally, absorbing polarizers show higher polarization efficiency than reflective polarizers. Therefore, an LCD incorporating an absorbing polarizer 12 can display images more vividly than the LCD without the absorbing polarizer 12. However, omitting the absorbing polarizer 12 may simplify the manufacturing process and reduce manufacturing cost.

Therefore, it may be preferable to employ the absorbing polarizer 12 in LCDs requiring higher display quality, and to omit the absorbing polarizer 12 in LCDs requiring lower manufacturing cost.

Figure 10:
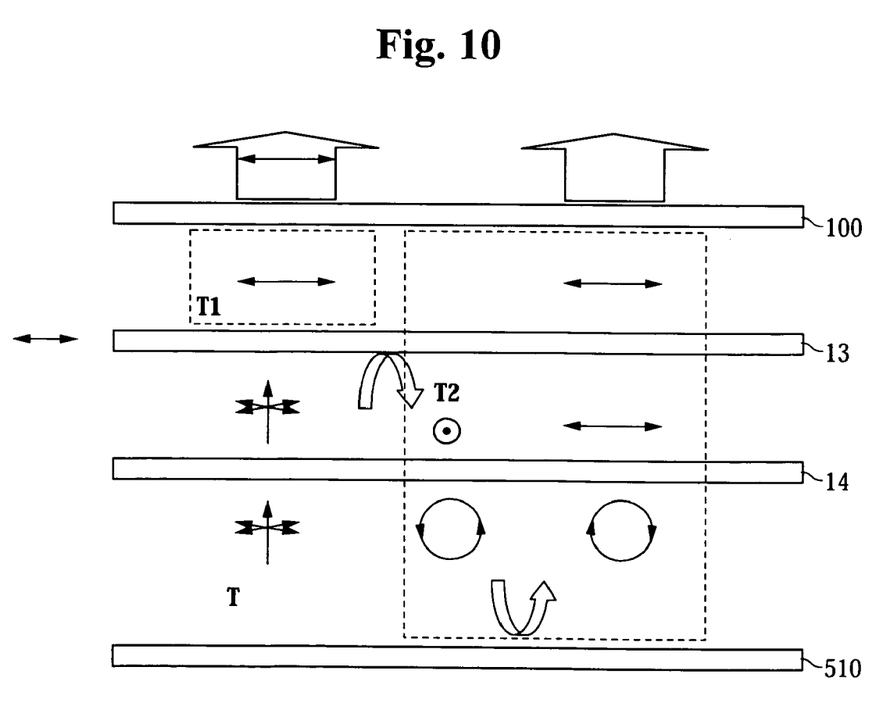
FIG. 10 shows the polarization states of light in the LCD of FIG. 9.

FIG. 10 shows the polarization states of light in the LCD of FIG. 9. The polarization states of light shown in FIG. 10 are equivalent to that of FIG. 8, except that the absorbing polarizer 12 is omitted.

FIG. 11 is a perspective view of an exemplary reflective polarizer according to an embodiment of the present invention.

Referring to FIG. 11, a reflective polarizer 13 comprises a substrate 13-2 and a plurality of metal lines 13-1 that are formed on a surface of the substrate 13-2 to be substantially parallel to each other. An interval between the two adjacent metal lines 13-1 is significantly narrower than a wavelength of the visible light generated by the backlight unit 500. In this case, the reflective polarizer 13 reflects light that is polarized parallel to the metal lines 13-1 and transmits light that is polarized perpendicular to the metal lines 13-1. The substrate 13-2 comprises glass or plastic, and the metal lines 13-1 comprise a reflective metal such Al.

In this embodiment, the optical retarder 14 is disposed under the reflective polarizer 13 even though it is not shown in FIG. 11. Alternatively, the reflective polarizer and optical retarder can be integrally formed as shown in FIG. 12 and FIG. 13.

Figure 12:
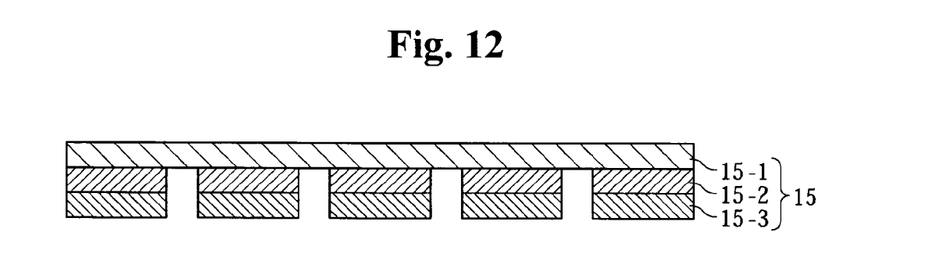
FIG. 12 and FIG. 13 are cross-sectional views of modified reflective polarizers according to other embodiments of the present invention.
Figure 13:
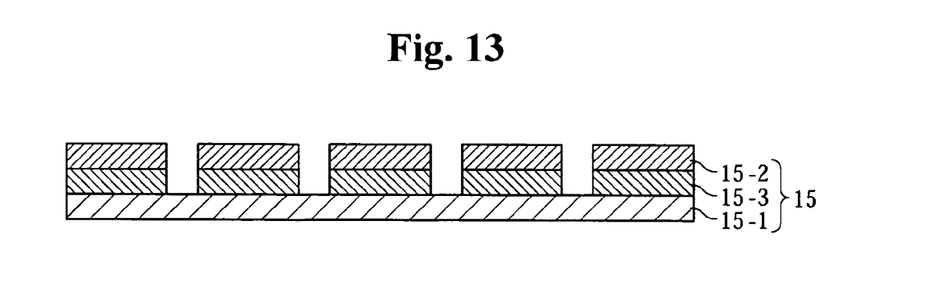

FIG. 12 and FIG. 13 are cross-sectional views of modified reflective polarizers according to other embodiments of the present invention.

Referring to FIG. 12, a reflective polarizer 15 comprises a substrate 15-1, a plurality of metal lines 15-2 formed on a surface of the substrate 15-1, and an optical retardation film 15-3 formed on the metal lines 15-2. In this structure, the metal lines 15-2 and the optical retardation film 15-3 are preferably configured in the same pattern. In this example, the metal lines 15-2 and the optical retardation film 15-3 can be simultaneously patterned in a single process in order to simplify the manufacturing process. The optical retardation film 15-3 may be obtained by curing LC molecules. A photosensitive alignment layer may be coated on the substrate 15-1 and then exposed to light to form an alignment axis. After the formation of the alignment axis, LC molecules are coated thereon and then cured, so that an optical retardation film 15-3 is completed on the reflective polarizer. A thickness of the optical retardation film 15-3 thus formed does not exceed 1 μm. In contrast with the film 15-3, a thickness of a separate optical retarder 14, as shown in FIG. 9, is in the range from 60 μm to 80 μm including a thickness of an adhesive used. Accordingly, the optical retardation film 15-3 may be significantly thinner than the optical retarder 14. The optical retardation film 15-3 has a slow axis and a fast axis. In this embodiment, it is preferable that either of the two axes is formed at ±45° to the metal lines 15-2.

FIG. 13 shows another reflective polarizer 15. This reflective polarizer 15 comprises a substrate 15-1, an optical retardation film 15-3 formed on a surface of the substrate 15-1, and a plurality of metal lines 15-2 formed on the optical retardation film 15-3.

In the above-illustrated embodiments of the present invention, the common electrode 270 is formed in the common electrode panel 200. However, the present invention is also applicable to other embodiments in which the common electrode and pixel electrodes are formed in the same panel.

In accordance with the present invention, the reflective polarizer and optical retarder are provided between the absorbing polarizer and the backlight unit, as described above. This structure can recycle light that would ordinarily be absorbed by the absorbing polarizer in the conventional LCDs to be used for the display. As a result, light efficiency and display luminance of the LCD may be improved.

The present invention should not be considered limited to the particular examples described above, but rather should be understood to cover all aspects of the invention as set out in the attached claims. Various modifications, equivalent processes, as well as numerous structures to which the present invention may be applicable will be readily apparent to those of skill in the art to which the present invention is directed upon review of the instant specification.

What is claimed is:

1. A liquid crystal display comprising:
   a display panel;
   a reflective polarizer provided under the display panel transmitting light that is linearly polarized in a first direction and reflecting light that is linearly polarized in a second direction perpendicular to the first direction; and
   a backlight unit provided under the reflective polarizer, said backlight unit comprising a light source for supplying light to the display panel,
   wherein the reflective polarizer includes a substrate, a plurality of metal lines, and a plurality of optical retardation films formed under the metal lines,
   wherein the metal lines are parallel to each other in the second direction, and an interval between two adjacent metal lines is narrower than a wavelength of visible light supplied by the backlight unit;
   wherein the plurality of optical retardation films are arranged to have substantially the same pattern as the metal lines in a plane view, and
   wherein a material disposed within the interval between the two adjacent metal lines is the same as that disposed within the interval between the optical retardation films.

2. The liquid crystal display of claim 1, further comprising a first absorbing polarizer provided between the display panel and the reflective polarizer.

3. The liquid crystal display of claim 2, wherein a transmission axis of the first absorbing polarizer is in the first direction.

4. The liquid crystal display of claim 3, further comprising a second absorbing polarizer coupled to an upper surface of the display panel.

5. The liquid crystal display of claim 4, wherein a transmission axis of the second absorbing polarizer is in the second direction.

6. The liquid crystal display of claim 1, wherein each of the plurality of optical retardation films has a slow axis and a fast axis, and a phase difference between the two axes is a quarter-wave for converting circularly polarized light into linearly polarized light or linearly polarized light into circularly polarized light.

7. The liquid crystal display of claim 6, wherein the fast axis or the slow axis of the respective optical retardation film is formed at an angle of ±45° relative to the first direction or the second direction.

8. The liquid crystal display of claim 7, wherein the substrate of the reflective polarizer is placed on the plurality of metal lines or under the respective optical retardation film.

9. The liquid crystal display of claim 1, wherein the respective optical retardation film is obtained by curing liquid crystal.

10. The liquid crystal display of claim 1, wherein the backlight unit further includes a reflective plate for reflecting light toward the display panel.

11. The liquid crystal display of claim 1, wherein the plurality of optical retardation films are parallel to each other in the second direction, and an interval between two adjacent optical retardation films is the same as that between two adjacent metal lines.

* * * * *